July 13, 1965 R. J. CALLOW, SR 3,194,375
FRUIT GATHERING DEVICE
Filed Oct. 4, 1962
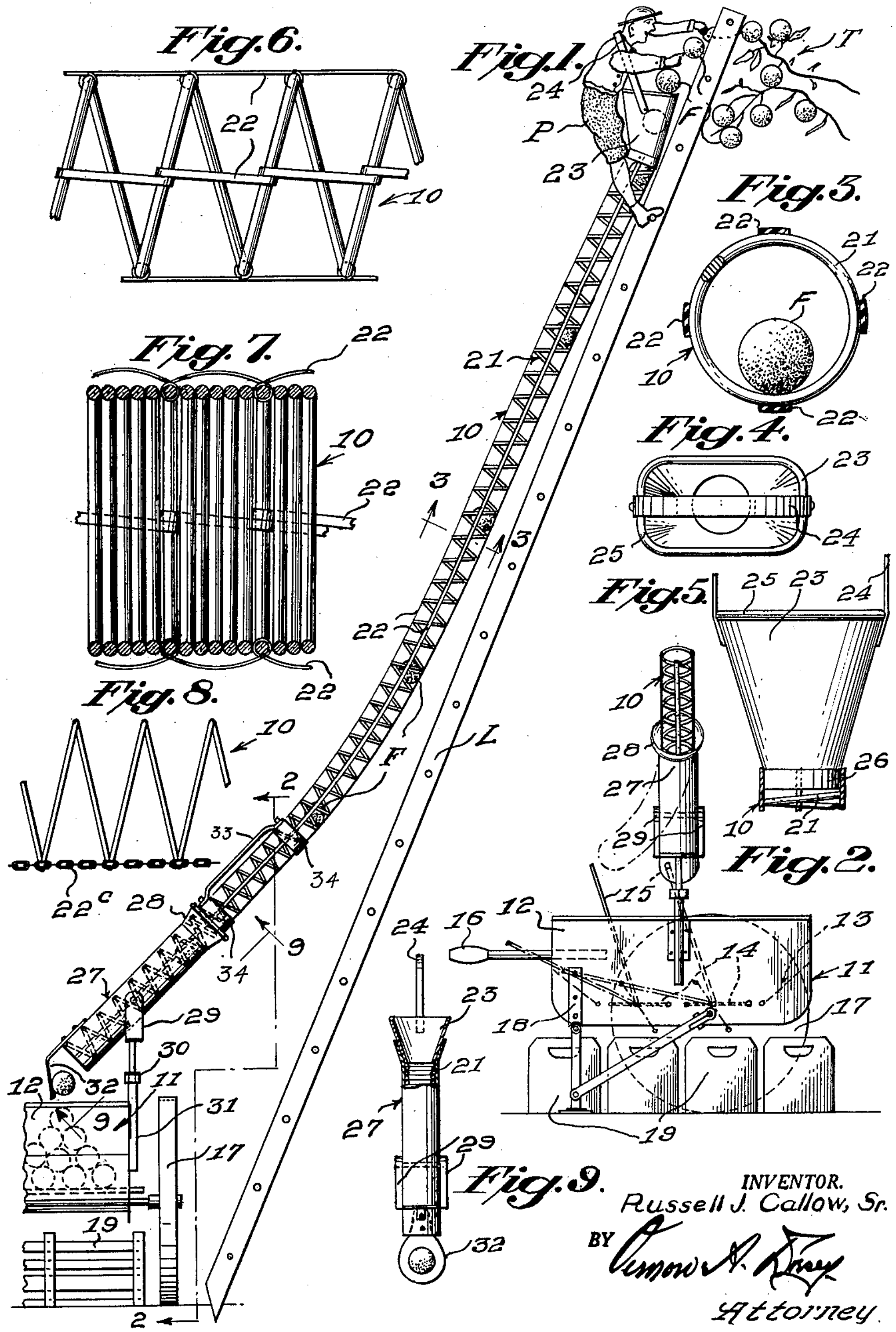
INVENTOR.
Russell J. Callow, Sr.
BY
Attorney.

United States Patent Office 3,194,375 Patented July 13, 1965

3,194,375
FRUIT GATHERING DEVICE
Russell J. Callow, Sr., 3102 Marion Drive, Ocala, Fla.
Filed Oct. 4, 1962, Ser. No. 228,308
4 Claims. (Cl. 193—7)

This invention relates to means for gathering fruit and particularly to means for guiding the picked fruit into a portable receptable from which the fruit is discharged into transportable containers.

A principal object of the invention is the provision of means disposable between a fruit receiving hopper or funnel and a fruit dispensing means and wherein the said first means is automatically variable in length for disposition of the fruit receiving hopper at variable distances from the fruit dispensing means whereby fruit is capable of being collected from trees of variable heights.

A further object of the invention is the provision of an improved fruit gathering structure which embodies a portable structure and a fruit collecting means which is adjustably supported by the portable structure and in which the fruit collecting means can be stored and transported within the portable structure when not in use.

A further and more specific object of the invention is the provision of a portable fruit receiving means, a fruit receiving funnel, and automatically adjustable means disposed between the fruit receiving means and the funnel for movement of the fruit from the said funnel to the portable fruit receiving means.

A still further object of the invention is to provide a fruit harvesting device in which the fruit picked from the tree is discharged in a portable receptacle and into boxes without bruising the same.

Other objects and advantages of the invention will become apparent in the course of the following detailed description, taken in connection with the accompanying drawing, wherein:

FIG. 1 is an elevational view on a substantially reduced scale and wherein the invention is disclosed in operative association with a fruit tree in the harvesting of fruit thereon.

FIG. 2 is a fragmental elevational view as observed in the offset planes indicated by the broken line 2—2 on FIG. 1.

FIG. 3 is a substantially enlarged view as observed in the plane of line 3—3 on FIG. 1.

FIG. 4 is a top plan view of a funnel or hopper in which the fruit is initially received in a harvesting operation thereon.

FIG. 5 is a broken side elevational view of the above referred to funnel or hopper.

FIG. 6 is a broken view in side elevation and on a substantially enlarged scale of a section of the fruit conveyor disposed between the funnel or hopper and the fruit receiving means and which conveyor is shown in an extended or operating position.

FIG. 7 is a broken view disclosing a section of the conveyor in a fully collapsed position, i.e., a stored position.

FIG. 8 is a still further embodiment of the fruit conveyor as disclosed in a fragmental elevational view thereof, showing a chain connected to parallel convolutions of the conveyor.

FIG. 9 is a broken elevational view as disclosed in the plane of line 9—9 on FIG. 1, with the cart omitted, showing the fruit conveyor in a collapsed position for storage or in a condition for transportation.

Referring now in detail to the drawing and first to FIG. 1 thereof, T designates a portion of a tree from which fruit F is being picked therefrom by a person P who utilizes a ladder L in the picking operation.

The essential feature of the invention is the provision of a fruit conducting chute 10 which is disposable between a fruit bearing tree T and a portable fruit collecting cart 11.

While the cart 11 may well be of various forms, a suitable one is shown in FIGS. 1 and 2 as comprising a box body 12 having a bottom 13 in which is disposed a pair of doors 14 which are provided with manually operable handles 15 for manual control of said doors, as is indicated by the solid and dotted line positions in FIG. 2.

The cart 11 further comprises a pair of actuating handles 16 and same is further provided with a pair of wide rim wheels 17 for movement of the cart over the ground.

The cart 11 is further provided with a pair of laterally opposed legs 18 by which the cart is stabilized in a rest position thereof.

A plurality of fruit collecting field boxes 19 are disposable beneath the cart 11 for collection of fruit therein.

The fruit conducting chute 10 comprises an elongated coil spring 21, the convolutions of which are interconnected by means of elastic stretch limit straps 22, the same being clearly shown in FIGS. 6 and 7.

A funnel 23 is disposed at the upper end of the chute 10 and which is provided with a shoulder strap 24 which strap is engageable with the shoulders of a fruit picker P, as indicated in FIG. 1, while the fruit picker is supported on the ladder L.

The funnel 23 is preferably provided with a bead 25 on the upper and larger end thereof, as indicated in FIG. 5, and the smaller end thereof is provided with a flange 26 which is received within the upper end of the chute 10, as shown in FIGS. 1 and 5.

The lower end portion of the chute 10 is anchored within a tube 27 which may be straight or curved, as indicated in FIG. 2 in dotted lines.

The tube 27 is made with a flared upper end 28, as is indicated in FIGS. 1 and 9. The purpose of the flared upper end of the tube 27 is to facilitate the collapsing of the spring chute 10 into the tube 27 when the chute 10 is in a stored condition.

Furthermore, the tube 27 is pivotally supported intermediate its ends on a yoke 29 which is pivotally supported on a vertical axis as is indicated by the pivot 30 on rod 31 which is supported on the cart 11, whereby the tube 27 is rotatable about both horizontal and vertical axes for efficient disposition of the fruit receiving funnel 23 in the fruit picking operations.

The tube 27 is provided with a cushion 32 (FIG. 1) for cushioning fruit as it is discharged from the tube 27.

As is shown in FIG. 9 of the drawing, the fruit conducting chute 10 is fully collapsed and disposed within the tube 27 which is supported by the cart 11 for convenient transportation and storage of the improved fruit gathering structure.

In use of the improved structure, the ladder L is set up at a fruit tree T and the picker P ascends the ladder and carries the funnel 23 on his shoulders, as indicated in FIG. 1. In such operation, the normally collapsed chute 10 is drawn out from the tube 27 and the elastic straps 22 while permitting expansion of the spring limit the expansion so as to prevent discharge of the fruit through the convolutions of the spring.

As shown in FIG. 8, the chute 10 has the adjacent convolutions connected by a chain 22[c] instead of stretch elastic straps.

The chute 10 of the invention is composed only of a spiral spring whereas other conveyor chutes have used tubes of canvas or the like.

By preference the elastic stretch limit straps 22 are connected to the convolutions of the chute closer together near the tube 27 and thereafter are gradually the distance between the connection of the straps and the convolution is increased. This is to allow the upper end adjacent the picker to move out of the tube 27 as the chute is extended.

Means for handling or controlling the fruit conducting chute 10 is provided by a handle 33 of flexible material connected at each end to circular bands 34, said bands being connected to the elastic stretch limit straps 22. The flexible handle 33 and the bands 34 will telescope into the tube 27 when the fruit conducting chute 10 is collapsed or stored in the tube 27.

Having thus described my invention, what I claim and desire to secure by U.S. Letters Patent is:

1. A fruit gathering device comprising a fruit receiving hopper, a fruit dispensing means and a chute formed of coiled wire interposed between the fruit receiving hopper and the fruit dispensing means, the convolutions of the coiled wire forming the chute being permanently attached by strands of material to limit the expansion between said convolutions forming the chute whereby fruit is delivered one to the other through the chute.

2. A fruit gathering device comprising a fruit receiving hopper, a fruit dispening means and a chute formed of coiled wire interposed between the fruit receiving hopper and the fruit dispensing means, the convolutions of the coiled wire forming the chute being permanently attached by elastic stretch limit straps to limit the expansion between said convolutions forming the chute whereby fruit is delivered one to the other through the chute.

3. A fruit gathering device comprising a fruit receiving hopper, a fruit dispensing means and a chute formed of coiled wire interposed between the fruit receiving hopper and the fruit dispensing means, the convolutions of the coiled wire forming the chute being permanently attached by strands of material to limit the expansion between said convolutions, said chute being stored in said fruit dispensing means when said chute is in a retracted position.

4. A fruit gathering device comprising a fruit receiving hopper, a fruit dispensing means and a chute formed of coiled wire interposed between the fruit receiving hopper and the fruit dispensing means, certain of the convolutions of the coiled wire forming the chute being permanently attached by strands of material to limit the expansion between said convolutions, said connections between said strands and said convolutions of the coiled wire being closer together adjacent the fruit dispensing means.

References Cited by the Examiner

UNITED STATES PATENTS

| | | | |
|---|---|---|---|
| 169,618 | 11/75 | Bitner. | |
| 455,328 | 7/91 | Herbert. | |
| 545,201 | 8/95 | Howard | 193—30 |
| 908,034 | 12/08 | Pyleck | 193—25 |
| 1,094,263 | 4/14 | Stevens. | |
| 1,185,110 | 5/16 | Le Baron. | |
| 1,295,630 | 2/19 | Sundh. | |
| 2,230,723 | 2/41 | Maclachlan. | |
| 2,430,658 | 11/47 | Andres | 193—25 |
| 2,576,154 | 11/51 | Trautvetter | 193—30 |
| 2,734,611 | 2/56 | Gordon. | |
| 2,843,241 | 7/58 | Clark | 193—25 |
| 2,927,432 | 7/60 | Colon | 56—328 |
| 2,943,432 | 7/60 | Colon | 56—328 |
| 2,973,112 | 2/61 | Young. | |

SAMUEL F. COLEMAN, *Primary Examiner.*

ANDRES H. NIELSEN, *Examiner.*